United States Patent
Kim

(10) Patent No.: US 7,633,664 B2
(45) Date of Patent: Dec. 15, 2009

(54) LASER SCANNING UNIT AND COLOR LASER PRINTER HAVING THE SAME

(75) Inventor: Hyung-soo Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 269 days.

(21) Appl. No.: 11/545,626

(22) Filed: Oct. 11, 2006

(65) Prior Publication Data

US 2007/0258121 A1      Nov. 8, 2007

(30) Foreign Application Priority Data

May 3, 2006      (KR) .................. 10-2006-0040118

(51) Int. Cl.
*G02B 26/08* (2006.01)

(52) U.S. Cl. .................................. 359/204.1

(58) Field of Classification Search ......... 359/204–208; 347/233, 241, 243
See application file for complete search history.

(56) References Cited

U.S. PATENT DOCUMENTS

| 7,126,735 B1 * | 10/2006 | Kinoshita et al. ........... 359/204 |
| 2004/0183890 A1 | 9/2004 | Sakamoto et al. |
| 2005/0151826 A1 | 7/2005 | Suzuki et al. |
| 2005/0219672 A1 | 10/2005 | Fujita et al. |

| 2006/0291026 A1 | 12/2006 | Miyatake |

FOREIGN PATENT DOCUMENTS

| EP | 0 854 048 | 7/1998 |
| EP | 2000267031 | 9/2000 |
| EP | 1 619 033 | 1/2006 |
| JP | 10020224 | 1/1998 |
| JP | 10-073778 | 3/1998 |
| JP | 11-064754 | 3/1999 |
| JP | 2003-185957 | 7/2003 |
| JP | 2004-085969 | 3/2004 |

* cited by examiner

*Primary Examiner*—Euncha P Cherry
(74) *Attorney, Agent, or Firm*—Roylance, Abrams, Berdo & Goodman, L.L.P.

(57) ABSTRACT

A laser scanning unit and an image forming apparatus having the same are provided. The laser scanning unit includes a plurality of light sources symmetrically disposed, and a rotatable deflector deflecting slantingly incident light beams symmetrically in a sub-scanning direction from the plurality of light sources. First and second f-θ lenses focus the light beams reflected by the deflector on scanning lines on photosensitive drums and are disposed symmetrically with respect to a rotational axis of the deflector. Mirrors guide the light beams that have passed through the first and second f-θ lenses toward the respective photosensitive drums. The mirrors are disposed asymmetrically with respect to the rotational axis of the deflector so that the scanning lines formed on the respective photosensitive drums may be deflected in the same direction.

32 Claims, 6 Drawing Sheets

LASER SCANNING UNIT AND COLOR LASER PRINTER HAVING THE SAME

CROSS-REFERENCE TO RELATED PATENT APPLICATIONS

This application claims the benefit under 35 U.S.C. § 119 (a) of Korean Patent Application No. 10-2006-0040118, filed on May 3, 2006, in the Korean Intellectual Property Office, the entire disclosure of which is hereby incorporated by reference.

BACKGROUND OF THE INVENTION

1. Field of the Invention

The present invention relates to a laser scanning unit and an image forming apparatus having the same. More particularly, the present invention relates to a laser scanning unit in which a relative error of scanning line deflections is reduced by forming the scanning line deflections according to each light path of a slanting incidence scanning optical system in a sub-scanning direction in the same direction, and an image forming apparatus having the same.

2. Description of the Related Art

Laser scanning units form an electrostatic latent image by scanning laser beams onto a photosensitive drum in a laser printer. Black-and-white laser printers fuse black ink onto a sheet of paper. Thus, only one laser scanning unit and only one organic photoconductive cell (OPC) photosensitive drum are used in a black-and-white laser printer. Because color laser printers transfer ink having four colors, such as black (K), magenta (M), yellow (Y), and cyan (C), onto a sheet of paper, four laser scanning units and four OPC photosensitive drums are needed in a color laser printer. However, a component that is given the greatest deal of weight on costs for manufacturing a color laser printer is a laser scanning unit. Thus, minimizing the number of laser scanning units is one method of reducing costs for a color laser printer. Additionally, color laser printers have a problem that jitter is generated in a spindle motor for rotating a rotational polygonal mirror according to each color and, thus, periodic shakes occur in each of the four laser scanning units with different properties. As such, four colors are printed on different lines when one line is printed on a sheet of paper, and picture quality is lowered. To overcome this problem in color laser printers, minute jitters and periodic shakes can be adjusted using an electrical, mechanical or optical method. This procedure causes an assembling property to be lowered and results in an increase in manufacturing costs. Thus, to reduce production costs for a color laser printer and to improve picture quality, a color image has been realized using one laser scanning unit.

FIG. 1 illustrates an optical scanner disclosed in Japanese Patent Laid-open Publication No. 2004-070108. The optical scanner includes a light source means 1, a deflection means 5 that deflects a light flux emitted from the light source means 1, a plurality of mirrors 2, 3 and 4 disposed between the light source means 1 and the deflection means 5, and a scanning optical system 6 that images a deflected light flux deflected by the deflection means 5 on a surface to be scanned 8. Two light fluxes emitted from the light source means 1 are slantingly incident with a certain slanting incidence angle in a sub-scanning direction to an orthogonal plane to a rotational axis of the deflection means 5 and are imaged on the surface to be scanned 8. The optical scanner can always image on an optical axis of a scanning optical element despite the slanting incidence angle when in a region where a spherical aberration is compensated and can make an image forming position coincide or approximately coincide in the sub-scanning direction on the surface to be scanned of two light fluxes that are slantingly incident within an effective scanning limit in a main scanning direction, thereby reducing a scanning line deflection.

FIG. 2A is a cross-sectional view in a main scanning direction of a conventional tandem type laser scanning unit in which slanting incidence scanning optical systems of FIG. 1 are disposed bilateral and symmetrical to deflection means 5. FIG. 2B is a cross-sectional view in a sub-scanning direction of the conventional tandem type laser scanning unit of FIG. 2A.

Referring to FIGS. 2A and 2B, one deflection means 5 is used in first through fourth light sources 1a, 1b, 1c, and 1d, and a plurality of reflection mirrors 2a, 2b, 2c, 2d, 3a, 3b, 3c, 3d, 4a, and 4b are disposed among first through fourth photosensitive drums 8a, 8b, 8c, and 8d, each of which correspond to each of the first through fourth light sources 1a, 1b, 1c, and 1d. The reflection mirrors form an electrostatic latent image on each of the first through fourth photosensitive drums 8a, 8b, 8c, and 8d. A light beam incident on and reflected from the deflection means 5 slants with a certain slanting incidence angle in a sub-scanning direction to an orthogonal plane to a rotational axis of the deflection means 5.

The arrangement shape of reflection mirrors before and after the scanning optical system 6 needs to be noted. Like the prior art, in a tandem type laser scanning unit in which light beams incident on and reflected from a deflection means are slantingly incident with a certain slanting incidence angle in a sub-scanning direction to separate the light beams from each other using reflection mirrors on a light path after the deflection means when the deflection means is thin, a scanning line deflection occurs symmetrical with respect to the light path in the sub-scanning direction regardless of the number or arrangement of scanning optical systems. That is, light beams emitted from light sources disposed in upward and downward directions are scanned through the deflection means and form a symmetrical scanning line deflection. As shown in FIGS. 2B and 3A, a first deflection light flux BMa from the first light source 1a and a second deflection light flux BMb from the second light source 1b are symmetrically deflected, and a first scanning line deflection Ba and a second scanning line deflection Bb are deflected in opposite directions. Additionally, a third deflection light flux BMc from a third light source 1c and a fourth deflection light flux BMd from a fourth light source 1d are symmetrically deflected, and a third scanning line deflection Bc and a fourth scanning line deflection Bd are deflected in opposite directions.

Referring to FIGS. 2B and 3B, the first scanning line deflection Ba is reflected twice through first and second mirrors 7a and 7c disposed after the deflection means 5 and is imaged on the first photosensitive drum 8a while the direction of the first scanning line deflection Ba is not changed. The second scanning line deflection Bb is reflected once through a third mirror 7b disposed after the deflection means 5 and is imaged on the second photosensitive drum 8b while the direction of the second scanning line deflection Bb is changed. The third scanning line deflection Bc is reflected twice through fourth and fifth mirrors 7d and 7f disposed after the deflection means 5 and is imaged on the third photosensitive drum 8c while the direction of the third scanning line deflection Bc is not changed. The fourth scanning line deflection Bd is reflected once through a sixth mirror 7e disposed after the deflection means 5 and is imaged on the fourth photosensitive drum 8d while the direction of the fourth scanning line deflection Bd is changed. As a result, as shown in FIG. 3B, the first through fourth scanning line deflections Ba, Bb, Bc, and Bd imaged on each of the first through fourth photosensitive drums 8a, 8b, 8c, and 8d are formed in opposite directions vertically with respect to the sub-scanning direction.

When a color image is formed, it is important to compensate a scanning line deflection on a monochrome color. However, a relative error of scanning line deflections that occurs when respective monochrome colors are combined with one another causes a more serious problem. Thus, a variety of methods and constructions for compensating a scanning line deflection on each color to have the same direction and the same amount have been suggested. In the prior art, scanning line deflections of the remaining three light paths are compensated based on a light path having the largest scanning line deflection to compensate a relative error of scanning line deflections. However, because directions of the respective scanning line deflections are not the same, there is a limitation in compensating the relative error of the scanning line deflections.

Accordingly, a need exists for an image forming apparatus having an improved laser scanning unit that reduces the relative error of scanning line deflections.

SUMMARY OF THE INVENTION

The exemplary embodiments of the present invention provide a laser scanning unit in which a relative error of scanning line deflections is reduced by forming the scanning line deflections according to each light path of a slanting incidence scanning optical system in a sub-scanning direction in the same direction, and an image forming apparatus having the same.

According to an aspect of the present invention, a laser scanning unit includes a plurality of light sources symmetrically disposed, and a rotatable deflector deflecting slantingly incident light beams symmetrically in a sub-scanning direction from the plurality of light sources. First and second f-θ lenses focus the light beams reflected by the deflector on scanning lines on photosensitive drums and are disposed symmetrically with respect to a rotational axis of the deflector. Mirrors guide the light beams that have passed through the first and second f-θ lenses toward the respective photosensitive drums. The mirrors are disposed asymmetrically with respect to the rotational axis of the deflector so that the scanning lines formed on the respective photosensitive drums may be deflected in the same direction.

The number of mirrors disposed on paths of light beams irradiated from light sources disposed toward a right upper portion of the deflector and the number of the mirrors disposed on paths of light beams irradiated from light sources disposed toward a left lower portion of the deflector may be equal to n. The number of mirrors disposed on paths of light beams irradiated from light sources disposed toward a right lower portion of the deflector and the number of mirrors disposed on paths of light beams irradiated from light sources disposed toward a left upper portion of the deflector may be equal to m.

According to another aspect of the present invention, a laser scanning unit includes first, second, third, and fourth light sources symmetrically disposed and irradiating first, second, third, and fourth light beams, and a rotatable deflector deflecting slantingly incident light beams symmetrically in a sub-scanning direction from the first through fourth light sources. A first f-θ lens focuses first and second light beams reflected by the deflector on scanning lines on first and second photosensitive drums. A second f-θ lens focuses third and fourth light beams reflected by the deflector on scanning lines on third and fourth photosensitive drums, and is disposed symmetrically with respect to the first f-θ lens and a rotational axis of the deflector. Mirrors guide the light beams that have passed through the first and second f-θ lenses toward the respective photosensitive drums. The deflected light beams proceed toward a left upper portion, a left lower portion, a right upper portion, and a right lower portion of the deflector, respectively. The number of mirrors disposed on paths of light beams irradiated from light sources disposed toward a right lower portion of the deflector and the number of mirrors disposed on paths of light beams irradiated from light sources disposed toward a left upper portion of the deflector are equal to n. The number of mirrors disposed on paths of light beams irradiated from light sources disposed toward a right upper portion of the deflector and the number of mirrors disposed on paths of light beams irradiated from light sources disposed toward a left lower portion of the deflector are equal to m. The variables n are m are preferably different from each other.

The variables n and m may be any one of 1, 2, and 3.

A difference between the variables n and m may be 1.

A mirror disposed on a path of a light beam irradiated from a light source disposed toward a right upper portion of the deflector and a mirror disposed on a path of a light beam irradiated from a light source disposed toward a left lower portion of the deflector may be spaced apart from each other by a predetermined gap G. A mirror disposed on a path of a light beam irradiated from a light source disposed toward a right lower portion of the deflector and a mirror disposed on a path of a light beam irradiated from a light source disposed toward a left upper portion of the deflector may be spaced apart from each other by a predetermined gap G.

The rotational axis of the deflector may be spaced apart from a central line among the photosensitive drums by ½ of the gap G so that the length of a light path ranging from each light source to each photosensitive drum may be substantially equal.

Other objects, advantages and salient features of the invention will become apparent from the following detailed description, which, taken in conjunction with the annexed drawings, discloses exemplary embodiments of the invention.

BRIEF DESCRIPTION OF THE DRAWINGS

The above and other features and advantages of the present invention will become more apparent by describing in detail exemplary embodiments thereof with reference to the attached drawings, in which.

Throughout the drawings, like reference numerals will be understood to refer to like parts, components and structures.

DETAILED DESCRIPTION OF EXEMPLARY EMBODIMENTS

The present invention will now be described more fully with reference to the accompanying drawings, in which exemplary embodiments of the invention are shown.

The laser scanning unit according to an exemplary embodiment of the present invention includes a plurality of light sources disposed symmetrically bilateral and a rotatable deflector that deflects light beams symmetrically bilateral and slantingly incident with a certain slanting incidence angle in a sub-scanning direction from the plurality of light sources. An electrostatic latent image is formed for forming a color image on a photosensitive drum. Light beams are slantingly incident on and reflected from the deflector so that scanning line deflections are formed on a surface to be scanned. Mirrors disposed between the deflector and the surface to be scanned are disposed asymmetrically with respect to the deflector so that directions of the scanning line deflections are substantially equal. That is, the number and arrangement of mirrors are adjusted and the directions of the scanning line deflections formed on respective photosensitive drums are made substantially equal so that a relative error of the scanning line deflections may be easily reduced.

Figure 1:
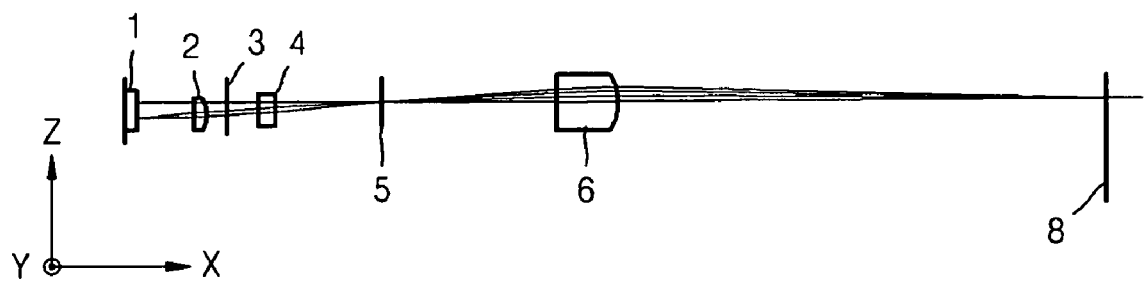
FIG. 1 illustrates an optical scanner disclosed in Japanese Patent Laid-open Publication No. 2004-070108.
Figure 2A:
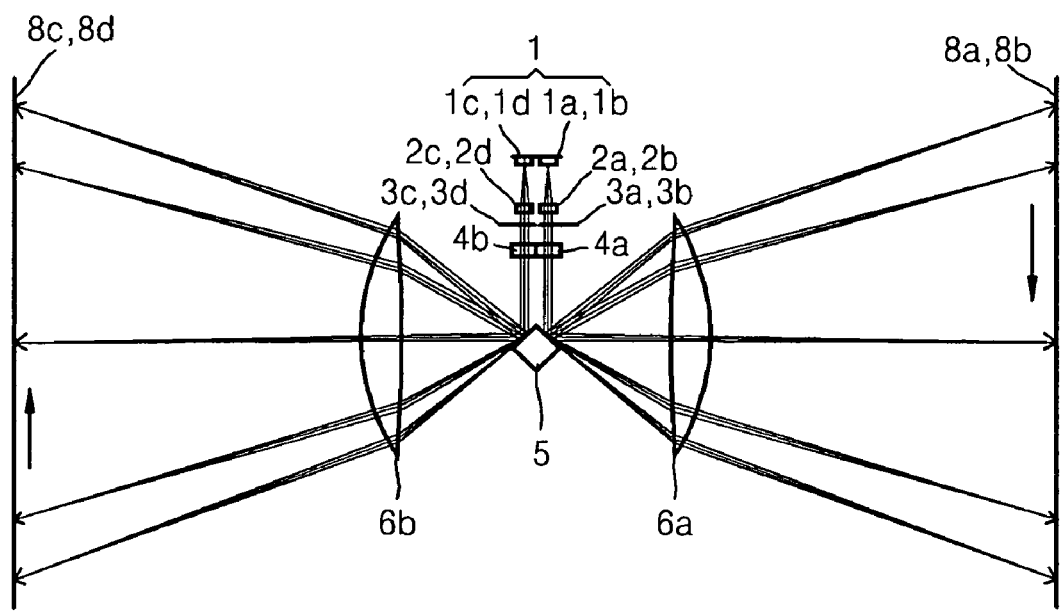
FIG. 2A is a cross-sectional view in a main scanning direction of a conventional tandem type laser scanning unit.
Figure 2B:
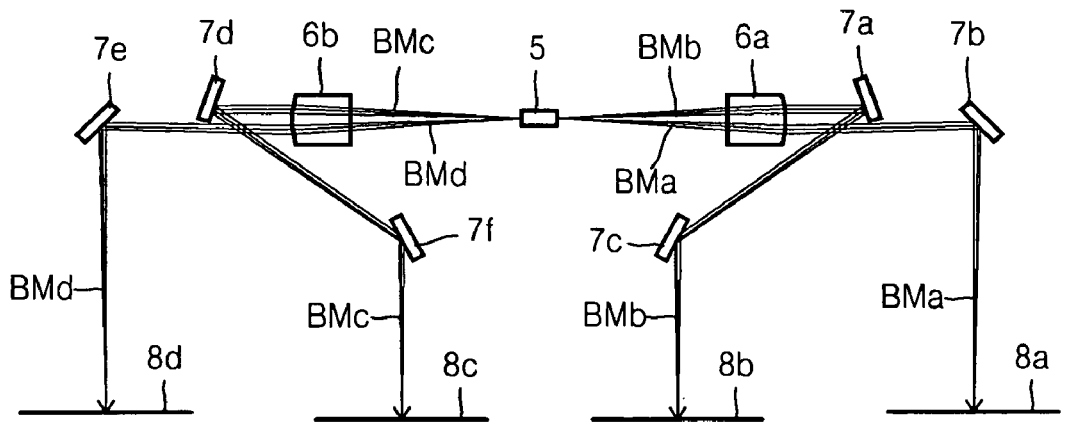
FIG. 2B is a cross-sectional view in a sub-scanning direction of the conventional tandem type laser scanning unit of FIG. 2A.
Figure 3A:
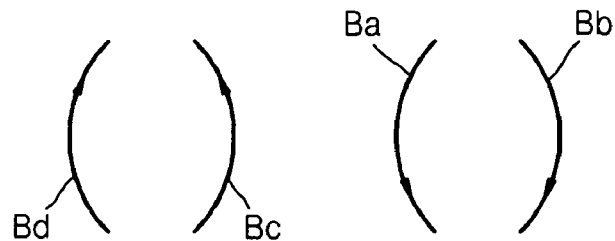
FIG. 3A illustrates scanning line deflections formed after light beams are reflected from a deflector in the conventional tandem type laser scanning unit of FIG. 2A.
Figure 3B:
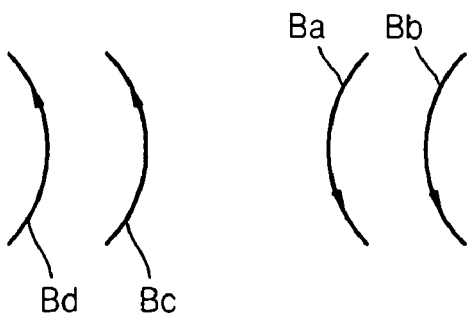
FIG. 3B illustrates scanning line deflections formed after light beams are reflected from mirrors disposed on each light path in the conventional tandem type laser scanning unit of FIG. 2A.
Figure 4:
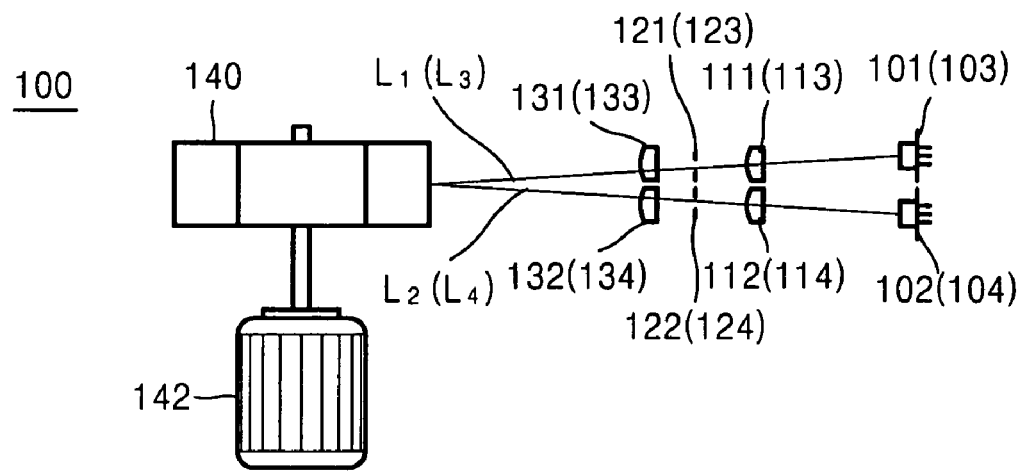
FIG. 4 is a partial side elevational view of a laser scanning unit according to an exemplary embodiment of the present invention.
Figure 5:
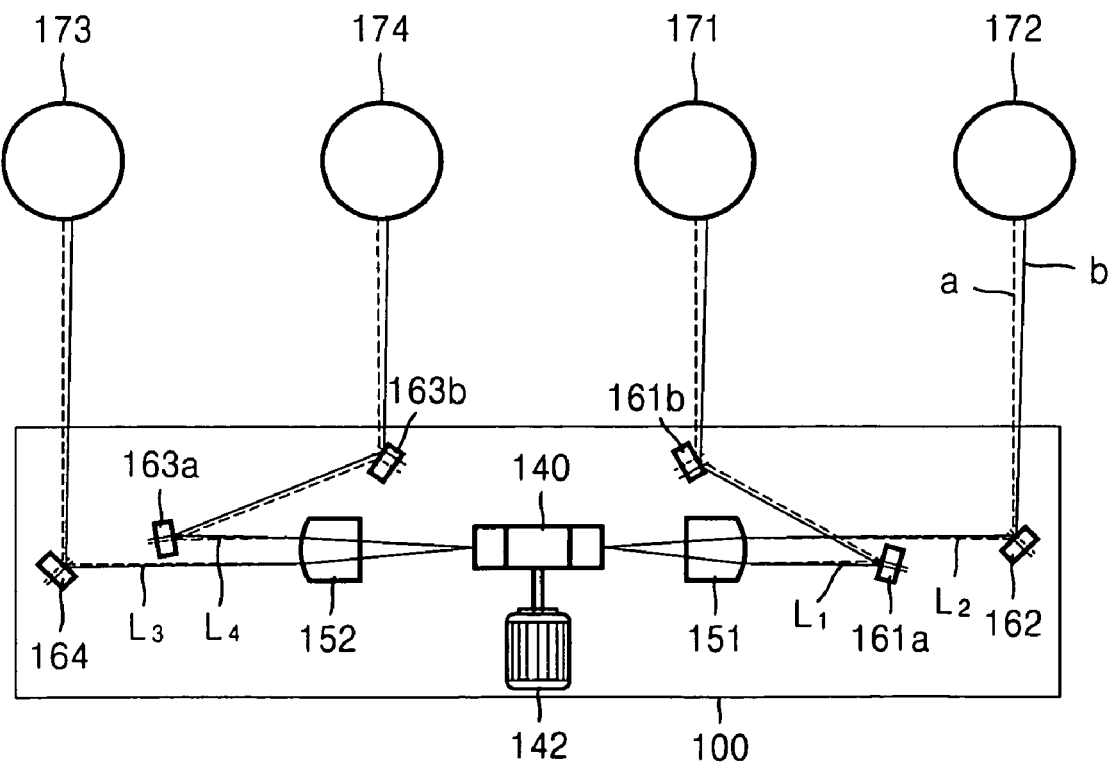
FIG. 5 is a front elevational view of the laser scanning unit of FIG. 4.

FIG. 4 is a partial side view of a laser scanning unit 100 according to an exemplary embodiment of the present invention. The laser scanning unit 100 includes first and second light sources 101 and 102 disposed in upward and downward directions, third and fourth light sources 103 and 104 disposed to be substantially parallel to the first and second light sources 101 and 102, and a deflector 140 that deflects light beams emitted from the first through fourth light sources 101, 102, 103, and 104. The first through fourth light sources 101, 102, 103, and 104 may be laser diodes for radiating first through fourth light beams $L_1$, $L_2$, $L_3$, and $L_4$ having different wavelengths. The deflector 140 may be a rotational polygonal mirror rotated by a motor 142. The first through fourth light beams $L_1$, $L_2$, $L_3$, and $L_4$ are reflected according to rotation of the deflector 140 and are scanned on the surface to be scanned of the first through fourth photosensitive drums 171, 172, 173, and 174 corresponding to the first through fourth light beams $L_1$, $L_2$, $L_3$, and $L_4$, as shown in FIG. 5. The first through fourth light sources 101, 102, 103, and 104 are on-off controlled so that an electrostatic latent image is formed on the surface to be exposed. In an exemplary embodiment of the present invention, one deflector 140 is commonly used with the first through fourth light sources 101, 102, 103, and 104.

A first collimating lens 111 and a first cylindrical lens 131 are disposed between the first light source 101 and the deflector 140. A second collimating lens 112 and a second cylindrical lens 132 are disposed between the second light source 102 and the deflector 140. A third collimating lens 113 and a third cylindrical lens 133 are disposed between the third light source 103 and the deflector 140. A fourth collimating lens 114 and a fourth cylindrical lens 134 are disposed between the fourth light source 104 and the deflector 140. The first through fourth collimating lenses 111, 112, 113, and 114 focus light beams irradiated from the first through fourth light sources 101, 102, 103, and 104 to be substantially parallel beams, and the first through fourth cylindrical lenses 131, 132, 133, and 134 focus the parallel beams on the deflector 140. Additionally, first through fourth apertures 121, 122, 123, and 124 are disposed between the first through fourth collimating lenses 111, 112, 113, and 114 and the first through fourth cylindrical lenses 131, 132, 133, and 134, respectively. An example in which an optical system excluding a beam deflector is provided on each light path is shown in FIG. 4. However, a common optical system is used in the first and second light sources 101 and 102, and a common optical system is used in the third and fourth light sources 103 and 104.

FIG. 5 illustrates the arrangement of mirrors disposed between the first through fourth photosensitive drums 171, 172, 173, and 174 and the deflector 140. A first f-θ lens 151 is provided to focus the first light beam $L_1$ and the second light beam $L_2$ emitted from the first and second light sources 101 and 102, respectively, on the first photosensitive drum 171 and the second photosensitive drum 172. A second f-θ lens 152 is provided to focus the third light beam $L_3$ and the fourth light beam $L_4$ emitted from the third and fourth light sources 103 and 104, respectively, on the third photosensitive drum 173 and the fourth photosensitive drum 174. The first f-θ lens 151 may be commonly used in the first and second light sources 101 and 102, and the second f-θ lens 152 may be commonly used in the third and fourth light sources 103 and 104.

The first light beam $L_1$ and the second light beam $L_2$ are slantingly incident on the deflector 140 in the sub-scanning direction and are reflected from the deflector 140 and then, upward and downward directions of the first light beam $L_1$ and the second light beam $L_2$ are changed. That is, the first light beam $L_1$ proceeds toward a right lower portion of the deflector 140, and the second light beam $L_2$ proceeds toward a right upper portion of the deflector 140.

Upward and downward directions of the third light beam $L_3$ and the fourth light beam $L_4$ are changed based on the deflector 140. Thus, the third light beam $L_3$ proceeds toward a left lower portion of the deflector 140, and the fourth light beam $L_4$ proceeds toward a left upper portion of the deflector 140.

The number of mirrors disposed on the path of a light beam from the first light source 101 and the number of mirrors disposed on the path of a light beam from the fourth light source 104 are constituted as the same number n. Additionally, the number of mirrors disposed on the path of a light beam from the second light source 102 and the number of mirrors disposed on the path of a light beam from the third light source 103 are constituted as the same number m. The variables m and n are preferably different numbers. The number of mirrors disposed on the path of the light beam toward the right lower portion of the deflector 140 and the number of the mirrors disposed on the path of the light beam toward the left upper portion of the deflector 140 are equal to n, and the number of mirrors disposed on the path of the light beam toward the right upper portion of the deflector 140 and the number of the mirrors disposed on the path of the light beam toward the left lower portion of the deflector 140 are equal to m, where the variables n and m are preferably different from each other.

Figure 9:
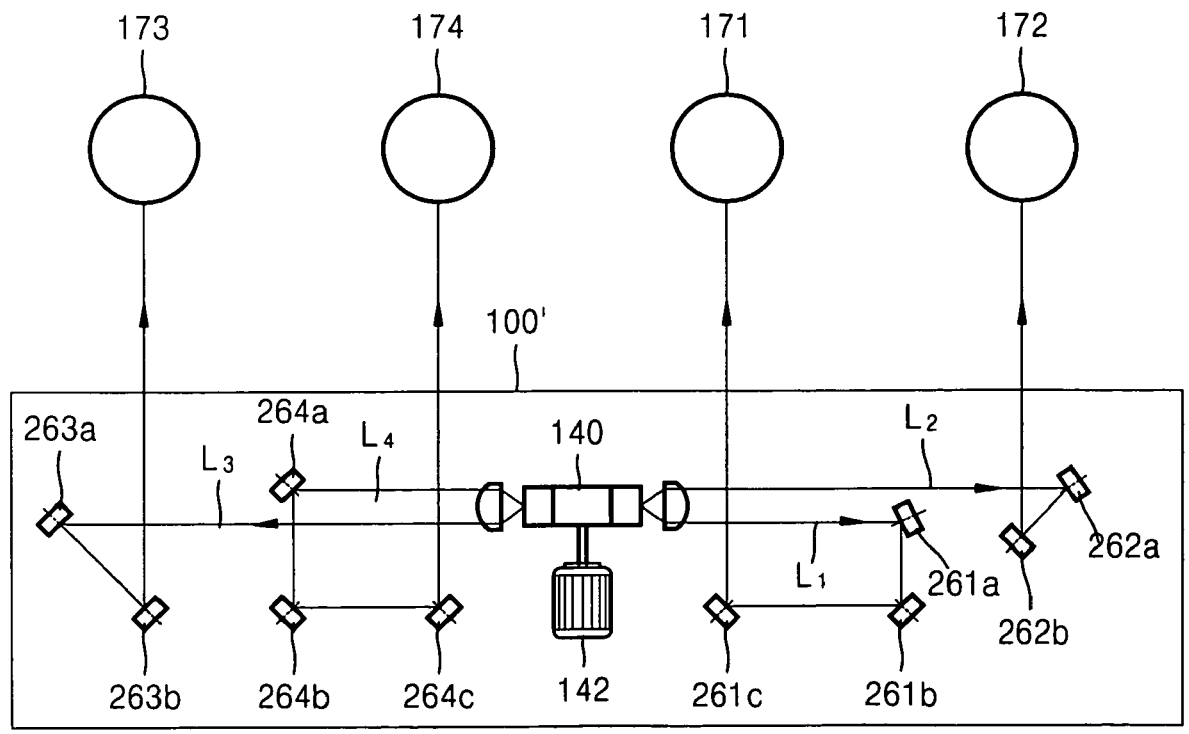
FIG. 9 is a front elevational view of a laser scanning unit according to another exemplary embodiment of the present invention.

For example, the variables n and m may be one of 1, 2, and 3, and a difference between n and m may be 1. Specifically, n may be 2 and m may be 1, or n may be 3 and m may be 2. An arrangement in which the variable n is 2 and the variable m is 1 is shown in FIG. 5, and an arrangement in which the variable n is 3 and the variable m is 2 is shown in FIG. 9.

First and second mirrors 161a and 161b are disposed on the path of the first light beam $L_1$. A third mirror 162 is disposed on the path of the second light beam $L_2$. A fourth mirror 164 is disposed on the path of the third light beam $L_3$. A fifth mirror 163a and a sixth mirror 163b are disposed on the path of the fourth light beam $L_4$.

Figure 6A:
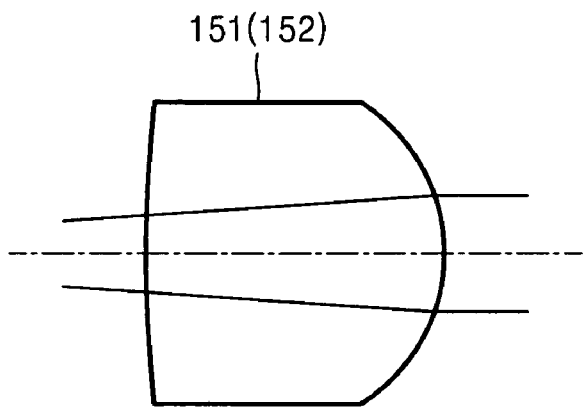
FIGS. 6A and 6B illustrate f-θ lenses used in the laser scanning unit of FIG. 4.
Figure 6B:
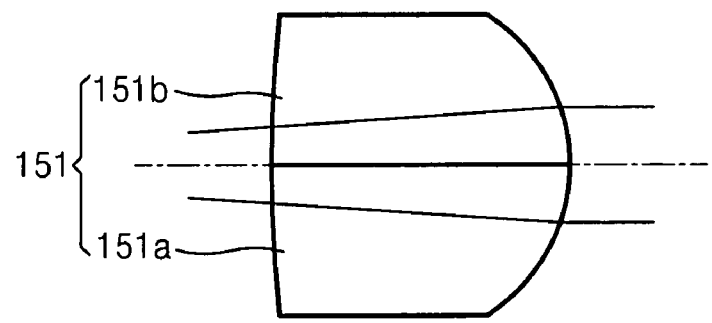

The first f-θ lens 151 and the second f-θ lens 152 may be formed unitarily as a one piece lens, as shown in FIG. 6A. Alternatively, the first f-θ lens 151 and the second f-θ lens 152 may be formed from two pieces of lenses consisting of an upper lens 151a and a lower lens 151b, as shown in FIG. 6B. The first f-θ lens 151 and the second f-θ lens 152 may be plastic aspherical lenses.

When an f-θ lens is comprised of the upper lens 151a and the lower lens 151b, the second light beam $L_2$ is focused through the upper lens 151a and the first light beam $L_1$ is focused through the lower lens 151b. The aspherical shapes of the first and second f-θ lenses 151 and 152 may be expressed by equation 1 when a direction of an optical axis is an X-axis and a direction perpendicular to the direction of the optical axis is a Y-axis, and a proceeding direction of a light beam refers to positive:

$$Z = \frac{\frac{y^2}{Rdy}}{1+\sqrt{1-\left(\frac{y}{Rdy}\right)^2}} + \sum_{m=3}^{10} A_m Y^m + \frac{x^2 c\left(1+\sum_{m=3}^{10} B_m Y^m\right)}{1+\sqrt{\left(1+K\left(1+\sum_{m=3}^{10} D_m Y^m\right)\right)^2 \left\{xc\left(1+\sum_{m=3}^{10} B_m Y^m\right)\right\}^2}} + \sum_{m=3}^{10} C_m Y^m, \quad (1)$$

where x is a distance from a vertex of a lens to the direction of the optical axis; y is a distance perpendicular to the optical axis; K is a conic constant; $A_m$, $B_m$, $C_m$, and $D_m$ are aspherical coefficients; and c is an inverse number (1/R) of a curvature radius in the vertex of the lens.

And, $Y=\sqrt{y^2}$, $X=\sqrt{x^2}$.

Figure 7:
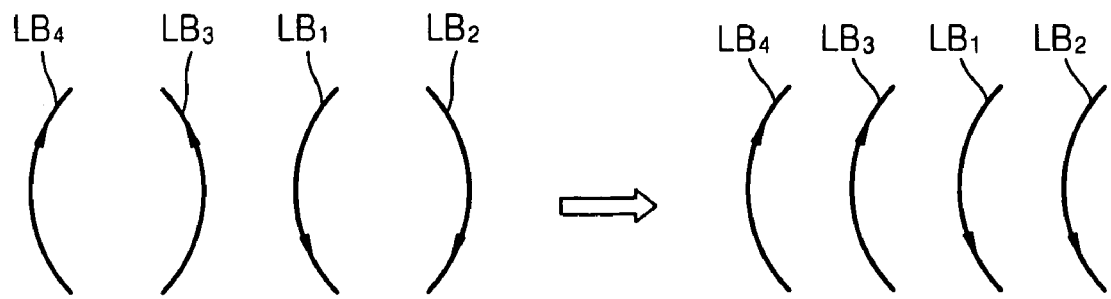
FIG. 7 illustrates a comparison of scanning line deflections formed after light beams are reflected from the deflector and scanning line deflections formed after the light beams are reflected from reflection mirrors disposed on each light path in the laser scanning unit of FIG. 4.

The effect in which scanning line deflections are formed in the same direction on the first through fourth photosensitive drums 171, 172, 173, and 174 by the arrangement of the mirrors shown in FIGS. 5, 6A, and 6B is described below. FIG. 7 illustrates a comparison of where the first through fourth light beams $L_1$, $L_2$, $L_3$, and $L_4$ respectively irradiated from the first through fourth light sources 101, 102, 103, and 104 have been reflected from the deflector 140 and have not yet passed through mirrors and the where the light beams $L_1$, $L_2$, $L_3$, and $L_4$ respectively irradiated from the first through fourth light sources 101, 102, 103, and 104 have been reflected from the deflector 140 and have passed through mirrors. Referring to FIG. 7, the first light beam $L_1$ irradiated from the first light source 101 and the second light beam $L_2$ irradiated from the second light source 102 are formed in opposite directions before a first scanning line deflection $LB_1$ formed by the first light beam $L_1$ irradiated from the first light source 101 and deflected by the deflector 140 and a second scanning line deflection $LB_2$ formed by the second light beam $L_2$ irradiated from the second light source 102 and deflected by the deflector 140 pass through the mirrors. Additionally, the third light beam $L_3$ irradiated from the third light source 103 and the fourth light beam $L_4$ irradiated from the third light source 104 are formed in opposite directions before a third scanning line deflection $LB_3$ formed by the third light beam $L_3$ irradiated from the third light source 103 and deflected by the deflector 140 and a fourth scanning line deflection $LB_4$ formed by the fourth light beam $L_4$ irradiated from the fourth light source 104 and deflected by the deflector 140 pass through the mirrors.

The first light beam $L_1$ is reflected twice through the first and second mirrors 161a and 161b and is formed on the first photosensitive drum 171 while the direction of the first scanning line deflection $LB_1$ is not changed. The second light beam $L_2$ is reflected once through the third mirror 162 and is formed on the second photosensitive drum 172 while the direction of the second scanning line deflection $LB_2$ is changed into an opposite direction. The third light beam $L_3$ is reflected once through the fourth mirror 164 and is formed on the fourth mirror 164 while the direction of the third scanning line deflection $LB_3$ is changed into an opposite direction. The fourth light beam $L_4$ is reflected twice through the fifth and sixth mirrors 163a and 163b and is formed on the fourth photosensitive drum 174 while the direction of the fourth scanning line deflection L4 is not changed. In FIG. 5, reference numeral a denotes a ray that is not deflected and scanned when a light beam is incident on the deflector 140 to be substantially perpendicular thereon and b denotes a ray that is deflected and scanned when a light beam is slantingly incident on the deflector 140.

As a result, the first through fourth scanning line deflections $LB_1$, $LB_2$, $LB_3$, and $LB_4$ are formed in the same direction. Thus, in an exemplary embodiment of the present invention, the number of mirrors disposed on each light path is adjusted and directions of scanning line deflections simply coincide with one another such that a relative error of the scanning line deflections is reduced.

Figure 8:
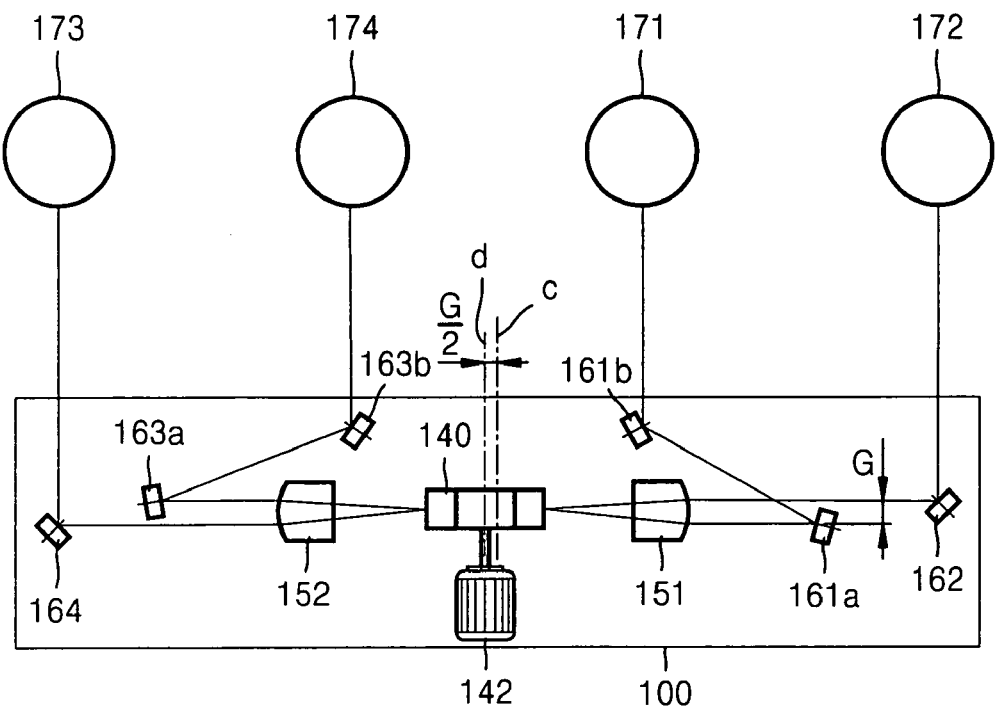
FIG. 8 is a front elevational view in which the position of the deflector is adjusted such that the length of each light path ranging from each light source to each photosensitive drum is substantially equal in the laser scanning unit of FIG. 5.

FIG. 8 illustrates an example in which the position of the deflector 140 is adjusted such that the length of each light path ranging from each light source to each photosensitive drum is substantially equal as the laser scanning unit 100 shown in FIG. 5.

The third mirror 162 disposed on a path of the second light beam $L_2$ is spaced apart from the sixth mirror 164 disposed on a path of the third light beam $L_3$ by a predetermined gap G. The first mirror 161a disposed on a path of the first light beam $L_1$ is spaced apart from the fourth mirror 163a disposed on a path of the fourth light beam $L_4$.

The path of the first light beam $L_1$ and the path of the fourth light beam $L_4$ are spaced apart from each other by a gap between the second mirror 161a and the sixth mirror 163a, and the path of the second light beam $L_2$ and the path of the third light beam $L_3$ are spaced apart from each other by a gap between the third mirror 162 and the fourth mirror 164. When the gap is G, a rotational axis d of the deflector 140 is moved by G/2 based on a central line c among the first through fourth photosensitive drums 171, 172, 173, and 174, the length of the respective light paths is approximately equal. The deflector 140 is moved in the direction in which the length of a light path is larger. In FIG. 8, the deflector 140 is moved by G/2 to the left based on the central line c.

The position of the mirrors disposed on each light path may also be changed without changing the position of the deflector 140 such that the length of each light path is substantially equal.

FIG. 9 illustrates an example of a laser scanning unit 100' in which the number of mirrors disposed on each light path is different than in FIG. 5. Three mirrors 261a, 261b, and 261c, and 264a, 264b, and 264c are disposed on each of the light paths of the first light beam $L_1$ and the fourth light beam $L_4$, respectively. Two mirrors 262a and 262b and 263a, and 263b are disposed on the light paths of the second light beam $L_2$ and the third light beam $L_3$, respectively. The scanning line deflection formed by the first light beam $L_1$ is reflected through three reflection mirrors, is deflected in a direction opposite to an initial deflection direction, and is formed on the first photosensitive drum 171. The scanning line deflection formed by the second light beam $L_2$ is reflected through two mirrors and is formed on the second photosensitive drum 172 while a deflection direction is not changed. Additionally, the scanning line deflection formed by the third light beam $L_3$ is reflected through two mirrors and is formed on the third photosensitive drum 172 while a deflection direction is not changed. The scanning line deflection formed by the fourth light beam L4 is reflected through three mirrors, is deflected in a direction opposite to an initial deflection direction, and is formed on the fourth photosensitive drum 174. As a result, the first through fourth scanning line deflections are formed in the same direction.

Thus, in an exemplary embodiment of the present invention, the number of mirrors disposed on each light path after the deflector is adjusted and directions of scanning line deflections simply coincide with one another such that a relative error of the scanning line deflections is reduced.

Figure 10:
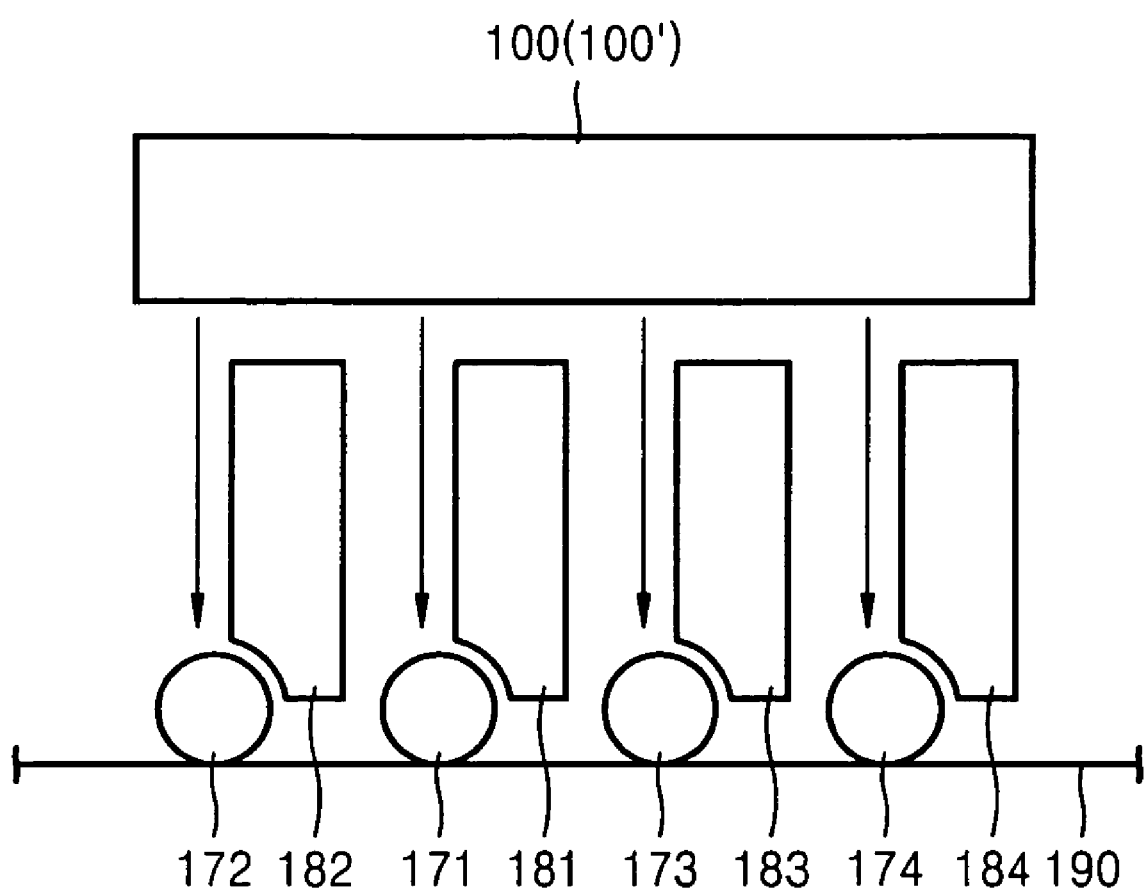
FIG. 10 is a schematic view of an image forming apparatus having the laser scanning unit according to an exemplary embodiment of the present invention.

FIG. 10 is a schematic view of an image forming apparatus for forming a color image by including laser scanning units 100 and 100' according to an exemplary embodiment of the present invention.

In the image forming apparatus, light beams are on-off controlled and irradiated from the laser scanning units 100 and 100'. The light beams are irradiated on the first, second, third, and fourth photosensitive drums 171, 172, 173, and 174 through the deflector 140 so that an electrostatic latent image is formed. Scanning lines formed on each of photosensitive drums have deflections in the same direction by mirrors disposed on each light path. Thus, a relative error of scanning line deflections may be reduced. A developing agent is supplied from first, second, third, and fourth developing units 181, 182, 183, and 184 corresponding to the first, second, third, and fourth photosensitive drums 171, 172, 173, and 174, and an electrostatic latent image is developed. A developed image for each color is sequentially transferred onto a transfer medium 190 so that a color image may be formed. A first line transferred onto the transfer medium 190 from the first photosensitive drum 171, a second line transferred onto the transfer medium 190 from the second photosensitive drum 172, a third line transferred onto the transfer medium 190 from the third photosensitive drum 173, and a fourth line transferred onto the transfer medium 190 from the fourth photosensitive drum 174 are sequentially overlapped so that a color image may be formed and subsequently is fused on a sheet of paper. The color image is formed in such a way that scanning line deflections are formed in the same direction. Thus, a relative error of scanning line deflections may be minimized and a color image of good quality may be provided.

As described above, in the laser scanning unit and the image forming apparatus according to exemplary embodiments of the present invention, mirrors disposed on each light path are disposed asymmetrically with respect to the deflector so that directions of the scanning line deflections formed when light beams irradiated from a plurality of light sources are through the deflector are substantially equal. Thus, a relative error of the scanning line deflections may be reduced and a color image of good quality may be formed. Additionally, directions of the scanning line deflections coincide with one another simply without using an additional component to reduce the number of the scanning line deflections in a conventional structure and thus is advantageous in an economic point of view. Furthermore, the image forming apparatus having the laser scanning unit may provide an image of good quality in which a relative error of the scanning line deflections is minimized.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A laser scanning unit, comprising:
a plurality of light sources symmetrically disposed;
a rotatable deflector for deflecting slantingly incident light beams symmetrically in a sub-scanning direction from the plurality of light sources;
first and second f-θ lenses for focusing the light beams reflected by the deflector on scanning lines on a plurality of photosensitive drums and disposed symmetrically with respect to a rotational axis of the deflector; and
a plurality of mirrors for guiding the light beams that have passed through the first and second f-θ lenses toward the respective photosensitive drums,
wherein the plurality of mirrors are disposed asymmetrically with respect to the rotational axis of the deflector so that the scanning lines formed on the respective photosensitive drums are deflected in the substantially same direction.

2. The laser scanning unit of claim 1, wherein
the number of the plurality of mirrors disposed on paths of light beams irradiated from the plurality of light sources disposed toward a right upper portion of the deflector and the number of the plurality of mirrors disposed on paths of light beams irradiated from the plurality of light sources disposed toward a left lower portion of the deflector are equal to the variable n; and
the number of the mirrors disposed on paths of light beams irradiated from the plurality of light sources disposed toward a right lower portion of the deflector and the number of the plurality of mirrors disposed on paths of light beams irradiated from the plurality of light sources disposed toward a left upper portion of the deflector are equal to the variable m.

3. The laser scanning unit of claim 2, wherein a difference between the variables n and m is 1.

4. The laser scanning unit of claim 2, wherein a first mirror disposed on a path of a light beam irradiated from a first light source disposed toward a right upper portion of the deflector and a second mirror disposed on a path of a light beam irradiated from a second light source disposed toward a left lower portion of the deflector are spaced apart from each other by a predetermined gap G, and a third mirror disposed on a path of a light beam irradiated from a third light source disposed toward a right lower portion of the deflector and a fourth mirror disposed on a path of a light beam irradiated from a fourth light source disposed toward a left upper portion of the deflector are spaced apart from each other by a the predetermined gap G.

5. The laser scanning unit of claim 4, wherein the rotational axis of the deflector is spaced apart from a center line of the plurality of photosensitive drums by ½ of the gap G so that a length of a light path ranging from each of the plurality of light sources to each of the respective photosensitive drums is substantially equal.

6. The laser scanning unit of claim 1, wherein the first and second f-θ lenses are respectively one or two plastic aspherical lenses.

7. The laser scanning unit of claim 1, wherein a collimating lens and a cylindrical lens are respectively disposed on each light path between the plurality of light sources and the deflector.

8. The laser scanning unit of claim 1, wherein a common first collimating lens and a common first cylindrical lens are disposed between the light source disposed on the left of the plurality of light sources and the deflector, and a common second collimating lens and a common second cylindrical lens are disposed between the light source disposed on the right of the plurality of light sources and the deflector.

9. A laser scanning unit, comprising:
first, second, third, and fourth light sources symmetrically disposed and irradiating first, second, third, and fourth light beams, respectively;
a rotatable deflector for deflecting slantingly incident light beams symmetrically in a sub-scanning direction from each of the light sources;
a first f-θ lens for focusing first and second light beams light beams reflected by the deflector on scanning lines on first and second photosensitive drums, respectively;
a second f-θ lens for focusing third and fourth light beams light beams reflected by the deflector on scanning lines on third and fourth photosensitive drums, respectively, and disposed symmetrically with respect to the first f-θ lens and a rotational axis of the deflector;
a plurality of mirrors for guiding the light beams that have passed through the first and second f-θ lenses toward the respective photosensitive drums;
wherein the deflected light beams proceed toward a left upper portion, a left lower portion, a right upper portion, and a right lower portion of the deflector, respectively, and the number of the plurality of mirrors disposed on paths of the light beams irradiated from the light sources disposed toward a right lower portion of the deflector and the number of the plurality of mirrors disposed on paths of the light beams irradiated from the light sources disposed toward a left upper portion of the deflector are equal to the variable n, and the number of the plurality of mirrors disposed on paths of the light beams irradiated from light sources disposed toward a right upper portion of the deflector and the number of the plurality of mirrors disposed on paths of the light beams irradiated from the light sources disposed toward a left lower portion of the deflector are equal to the variable in, and the variables n are in are different from each other.

10. The laser scanning unit of claim 9, wherein the variables n and in are any one of 1, 2, and 3.

11. The laser scanning unit of claim 9, wherein a difference between the variables n and in is 1.

12. The laser scanning unit of claim 9, wherein the mirror disposed on a path of the light beam irradiated from the light source disposed toward a right lower portion of the deflector and the mirror disposed on a path of the light beam irradiated from the light source disposed toward a left upper portion of the deflector are spaced apart from each other by a predetermined gap G, and the mirror disposed on a path of the light beam irradiated from the light source disposed toward a right upper portion of the deflector and the mirror disposed on a path of the light beam irradiated from the light source disposed toward a left lower portion of the deflector are spaced apart from each other by the predetermined gap G.

13. The laser scanning unit of claim 12, wherein the rotational axis of the deflector is spaced apart from a center line of the photosensitive drums by ½ of the gap G so that the length of the light path ranging from each of the light sources to each of the respective photosensitive drums is substantially equal.

14. The laser scanning unit of claim 9, wherein the first and second f-θ lenses are respectively one or two plastic aspherical lenses.

15. The laser scanning unit of claim 9, wherein a collimating lens and a cylindrical lens are respectively disposed on each of the light paths between each of the plurality of light sources and the deflector.

16. The laser scanning unit of claim 9, wherein a first collimating lens and a first cylindrical lens are disposed between the first and second light sources and the deflector, and a second collimating lens and a second cylindrical lens are disposed between the third and fourth light sources and the deflector.

17. An image forming apparatus, comprising:
a laser scanning unit comprising
a plurality of light sources symmetrically disposed;
a rotatable deflector for deflecting slantingly incident light beams symmetrically in a sub-scanning direction from the plurality of light sources;
first and second f-θ lenses for focusing the light beams reflected by the deflector on scanning lines on a plurality of photosensitive drums and disposed symmetrically with respect to a rotational axis of the deflector; and
a plurality of mirrors for guiding the light beams that have passed through the first and second f-θ lenses toward the respective photosensitive drums, the mirrors being disposed asymmetrically with respect to the rotational axis of the deflector so that the scanning lines formed on the respective photosensitive drums are deflected in the substantially same direction;
the photosensitive drums on which light beams from the laser scanning unit are irradiated and an electrostatic latent image is formed; and
a developing unit for developing the electrostatic latent image.

18. The laser scanning unit of claim 17, wherein
the number of the plurality of mirrors disposed on paths of light beams irradiated from the plurality of light sources disposed toward a right upper portion of the deflector and the number of the plurality of mirrors disposed on paths of light beams irradiated from the plurality of light sources disposed toward a left lower portion of the deflector are equal to the variable n; and
the number of the mirrors disposed on paths of light beams irradiated from the plurality of light sources disposed toward a right lower portion of the deflector and the number of the plurality of mirrors disposed on paths of light beams irradiated from the plurality of light sources disposed toward a left upper portion of the deflector are equal to the variable m.

19. The laser scanning unit of claim 18, wherein a difference between the variables n and m is 1.

20. The laser scanning unit of claim 18, wherein a first mirror disposed on a path of a light beam irradiated from a first light source disposed toward a right upper portion of the deflector and a second mirror disposed on a path of a light beam irradiated from a second light source disposed toward a left lower portion of the deflector are spaced apart from each other by a predetermined gap G, and a third mirror disposed on a path of a light beam irradiated from a third light source disposed toward a right lower portion of the deflector and a fourth mirror disposed on a path of a light beam irradiated from a fourth light source disposed toward a left upper portion of the deflector are spaced apart from each other by the predetermined gap G.

21. The laser scanning unit of claim 20, wherein the rotational axis of the deflector is spaced apart from a center line of the plurality of photosensitive drums by ½ of the gap G so that a length of a light path ranging from each of the plurality of light sources to each of the respective photosensitive drums is substantially equal.

22. The laser scanning unit of claim 17, wherein the first and second f-θ lenses are respectively one or two plastic aspherical lenses.

23. The laser scanning unit of claim 17, wherein a collimating lens and a cylindrical lens are respectively disposed on each light path between the plurality of light sources and the deflector.

24. The laser scanning unit of claim 17, wherein a common first collimating lens and a common first cylindrical lens are disposed between the light source disposed on the left of the plurality of light sources and the deflector, and a common second collimating lens and a common second cylindrical lens are disposed between the light source disposed on the right of the plurality of light sources and the deflector.

25. An image forming apparatus, comprising:
a laser scanning unit comprising
first, second, third, and fourth light sources symmetrically disposed and irradiating first, second, third, and fourth light beams;
a rotatable deflector for deflecting slantingly incident light beams symmetrically in a sub-scanning direction from the first through fourth light sources;
a first f-θ lens for focusing first and second light beams light beams reflected by the deflector on scanning lines on first and second photosensitive drums;
a second f-θ lens for focusing third and fourth light beams light beams reflected by the deflector on scanning lines on third and fourth photosensitive drums and disposed symmetrically with respect to the first f-θ lens and a rotational axis of the deflector;
a plurality of mirrors for guiding the light beams that have passed through the first and second f-θ lenses toward the respective photosensitive drums, wherein,
the deflected light beams proceed toward a left upper portion, a left lower portion, a right upper portion, and a right lower portion of the deflector, respectively, and the number of the plurality of mirrors disposed on paths of light beams irradiated from the light sources disposed toward a right lower portion of the deflector and the number of the plurality of mirrors disposed on paths of light beams irradiated from the light sources disposed toward a left upper portion of the deflector are equal to the variable n, and the number of the plurality of the mirrors disposed on paths of light beams irradiated from the light sources disposed toward a right upper portion of the deflector and the number of the plurality of the mirrors disposed on paths of light beams irradiated from the light sources disposed toward a left lower portion of the deflector are equal to the variable m, and the variables n are m are different from each other;
the photosensitive drums on which the light beams from the laser scanning unit are irradiated and an electrostatic latent image is formed; and
a developing unit developing the electrostatic latent image.

26. The laser scanning unit of claim 25, wherein the variables n and m are any one of 1, 2, and 3.

27. The laser scanning unit of claim 25, wherein a difference between the variables n and m is 1.

28. The laser scanning unit of claim 25, wherein the mirror disposed on a path of the light beam irradiated from the light source disposed toward a right lower portion of the deflector and the mirror disposed on a path of the light beam irradiated from the light source disposed toward a left upper portion of the deflector are spaced apart from each other by a predetermined gap G, and the mirror disposed on a path of the light beam irradiated from the light source disposed toward a right upper portion of the deflector and the mirror disposed on a path of the light beam irradiated from the light source disposed toward a left lower portion of the deflector are spaced apart from each other by predetermined gap G.

29. The laser scanning unit of claim 28, wherein the rotational axis of the deflector is spaced apart from a center line of the photosensitive drums by ½ of the gap G so that the length of the light path ranging from each of the light sources to each of the respective photosensitive drums is substantially equal.

30. The laser scanning unit of claim 25, wherein the first and second f-θ lenses are respectively one or two plastic aspherical lenses.

31. The laser scanning unit of claim 25, wherein a collimating lens and a cylindrical lens are respectively disposed on each of the light paths between each of the plurality of light sources and the deflector.

32. The laser scanning unit of claim 25, wherein a first collimating lens and a first cylindrical lens are disposed between the first and second light sources and the deflector, and a second collimating lens and a second cylindrical lens are disposed between the third and fourth light sources and the deflector.

* * * * *

UNITED STATES PATENT AND TRADEMARK OFFICE
CERTIFICATE OF CORRECTION

| | | |
|---|---|---|
| PATENT NO. | : 7,633,664 B2 | Page 1 of 1 |
| APPLICATION NO. | : 11/545626 | |
| DATED | : December 15, 2009 | |
| INVENTOR(S) | : Hyung-soo Kim | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 334 days.

Signed and Sealed this

Ninth Day of November, 2010

David J. Kappos
*Director of the United States Patent and Trademark Office*